Nov. 4, 1958 R. H. REED 2,859,438
RANGE-HEIGHT PARALLEL-TYPE RADAR SYSTEM
Filed Jan. 31, 1955 3 Sheets-Sheet 2
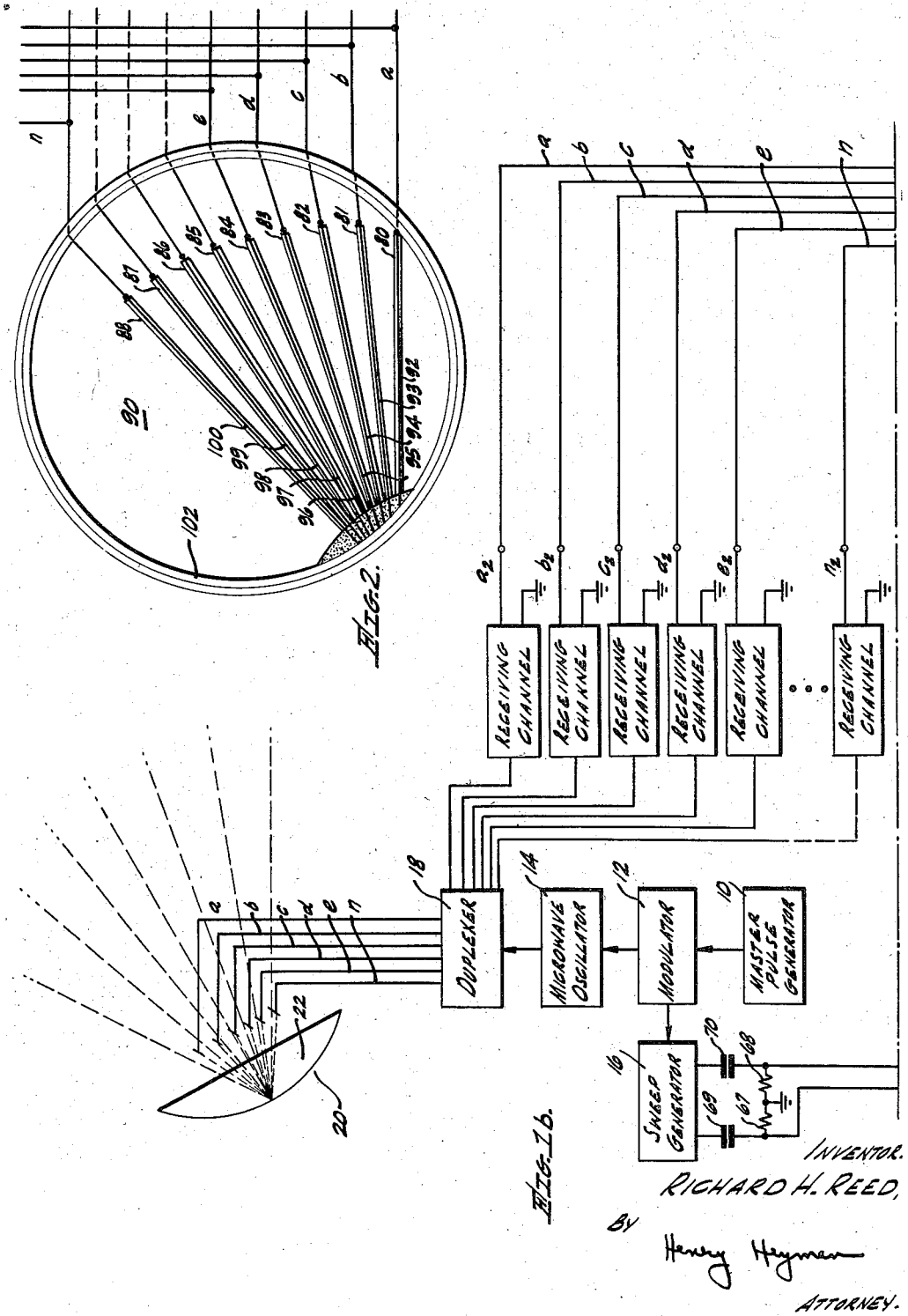
INVENTOR.
RICHARD H. REED,
BY
Henry Heyman
ATTORNEY.

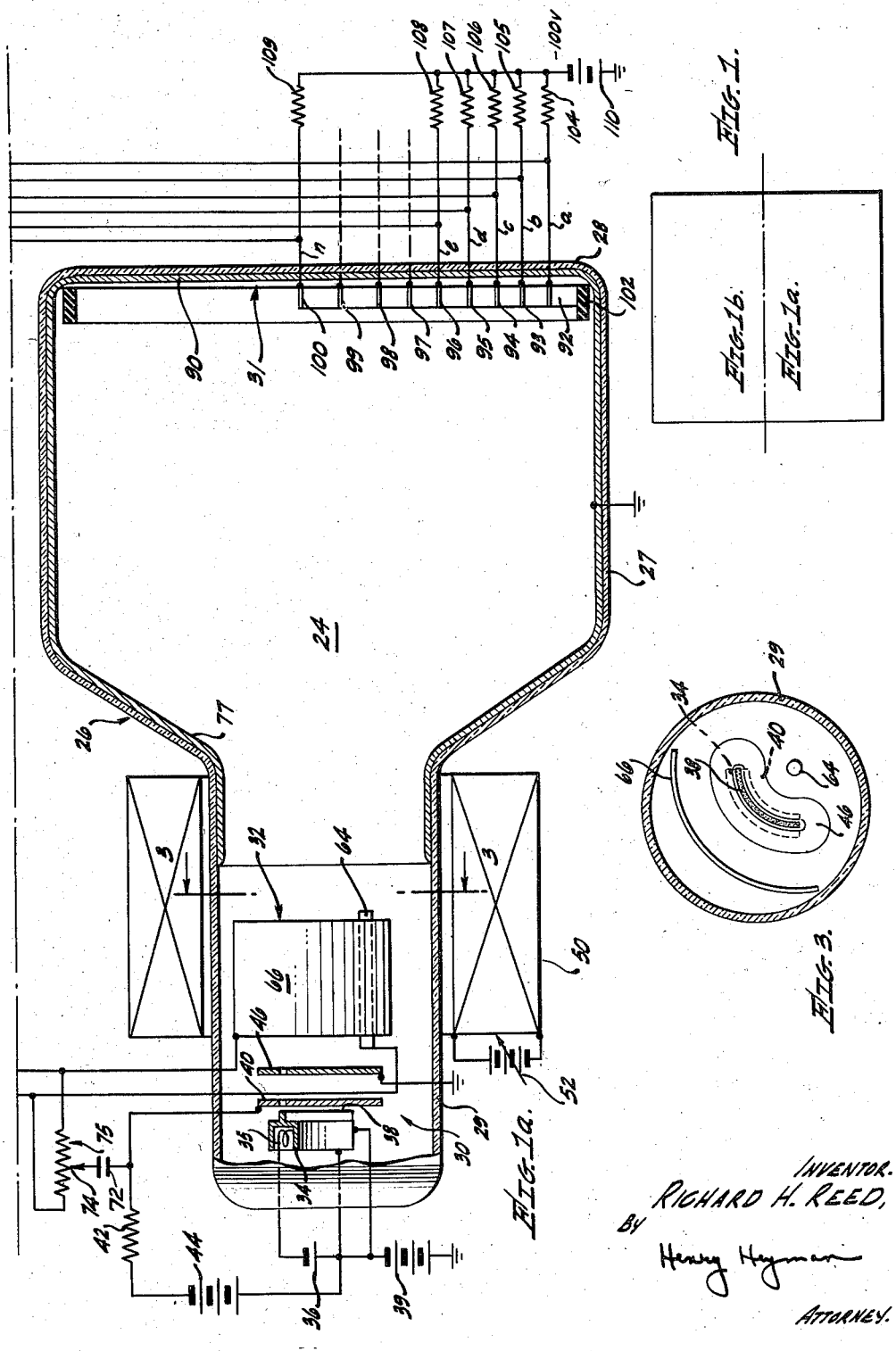

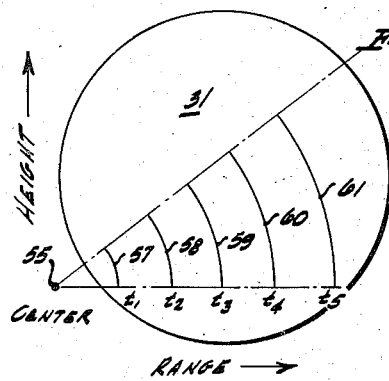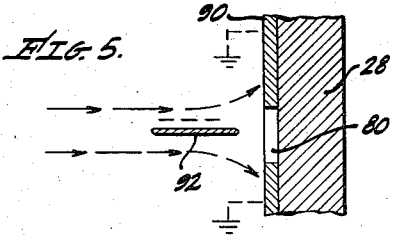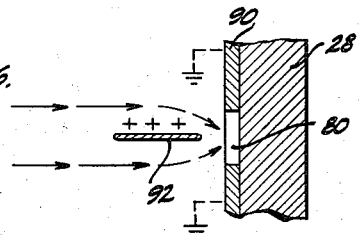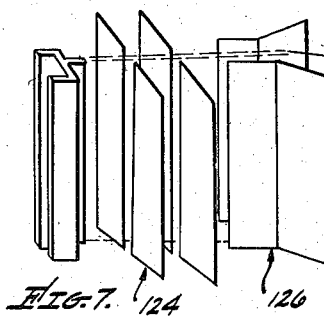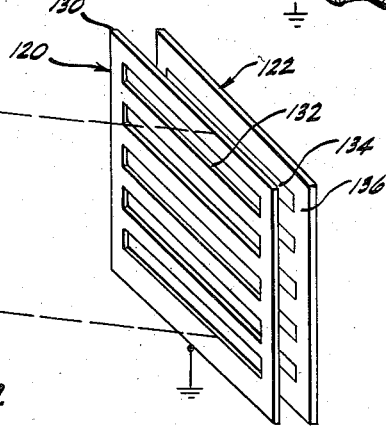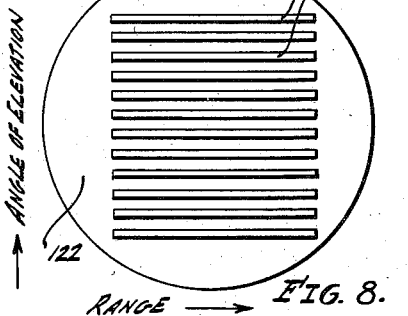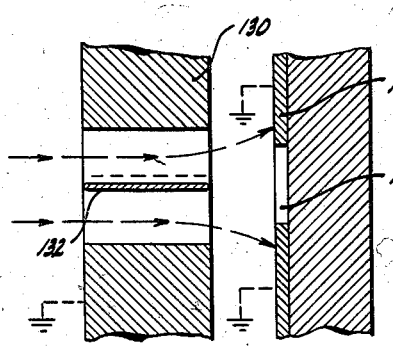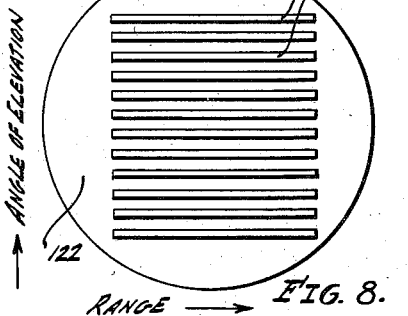

United States Patent Office 2,859,438
Patented Nov. 4, 1958

2,859,438

RANGE-HEIGHT PARALLEL-TYPE RADAR SYSTEM

Richard H. Reed, Los Angeles, Calif., assignor to Hughes Aircraft Company, Culver City, Calif., a corporation of Delaware Application January 31, 1955, Serial No. 484,964

7 Claims. (Cl. 343—11)

This invention relates to parallel-type radar systems and more particularly to a radar system incorporating an indicator tube capable of simultaneously presenting range-height information from a plurality of receiver channels.

In a typical parallel-type range-height radar system, a transmitted electromagnetic pulse is radiated in a broad vertical beam. The reflected energy of this transmitted pulse is then received by a plurality of receiving channels, each of which is responsive to a predetermined portion of the vertical sector. In this manner the particular channel on which a target echo is received is indicative of the angle of elevation of the target from the position of the radar system. This angle of elevation of the target together with its range provides the height of the target.

In the above type radar system, a problem arises in that it is difficult to provide apparatus for efficiently displaying information received from each channel corresponding to the respective predetermined portions of vertical angle. One typical indicating system employs a separate plan position indicator display for each receiving channel. In that a representative range-height radar system may have from ten to twenty receiving channels, it is apparent that a similar number of plan position indicator displays would not only be complex from the equipment point of view, but prohibitive from the standpoint of personnel required to operate the system. An alternative expedient to present range-height information would be to employ a range-height indicator tube having as many electron guns and deflection systems as there are receiving channels. A range-height indicator tube of this type is neither simple nor convenient to construct.

The range-height radar system of the present invention overcomes the above disadvantages by utilizing an improved range-height indicator tube.

It is therefore an object of this invention to provide a range-height parallel-type radar system incorporating an improved indicator tube capable of presenting range-height information in a single display.

Another object of this invention is to provide a range-height indicator tube capable of simultaneously presenting target indications in response to a plurality of receiving channels.

Still another object of this invention is to provide an indicator tube incorporating apparatus for producing an expanding circular beam.

One embodiment of the indicator tube of the present invention comprises an electron gun capable of generating a beam having the shape of an angular portion of a hollow cone. By means of a polar deflection system, the configuration of the pattern produced by this beam on a viewing screen is caused to progressively expand from and about a point to a circular arc covering a substantial portion of the viewing screen. In operation, this circular configuration is made to increase at a constant rate so that it effectively represents the wave front emanating from a radar antenna. The viewing screen of the range-height indicator tube constitutes a series of fluorescent strips, the strips having one extremity converging at a common point and each strip being disposed at an angle representative of the portion of vertical angle covered by an associated receiving channel. The remaining portion of the viewing screen is covered with a non-fluorescent conductive material.

Conductive ribbons coupled to the respective receiving channels are then disposed edgewise over their associated fluorescent strips. When a conductive ribbon is driven positive by a target echo signal, electrons are converged towards its associated fluorescent strip to produce a visual indication representative of the position of the target.

In an alternative embodiment of the present invention, a range-height indicator tube is employed that utilizes a flat sheet electron beam in conjunction with a series of parallel fluorescent strips disposed on the viewing screen. An indicator tube of this type has advantage in its simplicity but has a less desirable display in that the relative position of the targets appearing on the viewing screen is not representative of their actual position.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 1 is a block diagram of the range-height parallel-type radar system of the invention including an enlarged schematic cross sectional view of the indicator tube;

Fig. 2 is a plan view of the viewing end of the tube of Fig. 1 showing details of the connections to its terminals;

Fig. 3 is a cross section taken on lines 3—3 of the tube of Fig. 1 showing details of the electron gun and deflecting system;

Fig. 4 is a schematic representation of the display produced by the tube of Fig. 1;

Figs. 5 and 6 are schematic sectional views illustrating the operation of the viewing apparatus of the tube of Fig. 1;

Fig. 7 is a view in perspective showing an alternative range-height indicator tube for use with range-height parallel-type radar systems of the type shown in Fig. 1;

Fig. 8 is a schematic representation of the display produced by the tube of Fig. 7; and Figs. 9 and 10 are schematic sectional views illustrating the operation of the tube of Fig. 7.

Referring now to Fig. 1 there is shown a preferred embodiment of the range-height parallel-type radar system of the present invention. This system comprises a master pulse generator 10 which provides synchronization for a modulator 12. Modulator 12, in response to a trigger signal from master pulse generator 10, produces a high voltage pulse which is impressed on a microwave oscillator 14 simultaneously with a trigger pulse which is impressed on a sweep generator 16 to initiate the generation of a sweep voltage.

The microwave output pulse generated by microwave oscillator 14 is impressed on a multiple duplexer 18 which automatically energizes a plurality of radiators $a$, $b$, $c$, $d$, $e$, ... $n$ of an antenna system 20. Hence, the number of radiators is $n$ and the radiators $a$, ... $n$ are arranged so that the composite beam radiated from the antenna has a broad vertical shape. The electromagnetic energy radiated and received by each individual radiator $a$, $b$, $c$, $d$, $e$, ... $n$, however, covers only a predetermined portion of vertical angle. This may be accomplished, for example, by arranging the radiators in vertically spaced relationship about the focal point of a paraboloid reflector 22. The electromagnetic energy received by the individual radiators $a$, ... $n$ in response to the transmitted energy is automatically switched by the multiple duplexer 18 to a corresponding number of receiving channels $a_1$, $b_1$, $c_1$, $d_1$, $e_1$, ... $n_1$, respectively. The receiving channels $a_1$, $b_1$, $c_1$, $d_1$, $e_1$, ... $n_1$, have output leads $a_2$, $b_2$, $c_2$, $d_2$, $e_2$, ... $n_2$, respectively. The sweep voltage produced by sweep generator 16 together with the output from receiving channels $a_1$, $b_1$, $c_1$, $d_1$, $e_1$, ... $n_1$ is then impressed upon an improved range-height indicator tube 24 to provide a coordinated presentation of the information received.

More particularly, range-height indicator tube 24 comprises an evacuated envelope 26 constituting an enlarged cylindrical portion 27 with a flat viewing portion 28 on its right extremity and a neck portion 29 on its left extremity, as viewed in the drawing. The neck portion 29 houses an electron gun 30 for producing an electron beam having a circular arc cross section directed towards a viewing screen 31 disposed on the flat portion 28, and a polar deflecting system 32 for simultaneously deflecting the circular arc electron beam in a radial direction. Electron gun 30, an end view of which is shown in Fig. 3, comprises a cathode 34 which is energized by a heater 35 connected across a battery 36. Cathode 34 has an electron emitting surface 38 which has the configuration of a sector of a circle. Cathode 34 is maintained at a potential of the order of −3000 volts negative with respect to ground by means of a connection to the negative terminal of a battery 39, the positive terminal of which is connected to ground.

An intensity electrode 40, having an aperture in register with the electron emitting surface 38 of cathode 34, is disposed adjacent to the cathode 34 as shown in the drawing. The intensity electrode 40 is maintained at a quiescent potential of the order of 50 volts negative with respect to that of cathode 34. This is effected by a connection therefrom through a load resistor 42 to the negative terminal of a battery 44, the positive terminal of which is connected to the cathode 34. An accelerating electrode 46 is disposed adjacent to the intensity electrode 40 and to the right thereof as shown in the figure. Accelerating electrode 46 has an aperture in register with that of the intensity electrode 40 and is maintained at ground potential by a connection thereto to provide suitable acceleration for the electron beam.

The electron beam produced by electron gun 30 is focused by means of a magnetic focusing solenoid 50 disposed concentrically about the neck portion 29. A current is caused to flow in focusing solenoid 50 to focus the aperture in intensity grid 40 on the viewing screen 31. This current in solenoid 50 is provided by appropriate connections to a variable potential source 52. From the above, it is apparent that the electron beam produces a pattern on the viewing screen 31 in the form of a circular arc.

The polar deflection system 32 is adapted to deflect each portion of the circular electron beam in a radial direction with respect to its own center. In the present case, the center is located to one side of the viewing screen 31 so that the composite beam expands in a circular fashion as it is deflected thereacross. An illustration of the successive patterns produced by the electron beam on viewing screen 31 is shown in Fig. 4. Referring to this figure, the "center" of the circle of the electron beam is located at a point 55. The patterns produced by the beam at successive intervals of time $t_1$, $t_2$, $t_3$, $t_4$, and $t_5$ during a single sweep of the beam are illustrated by lines 57, 58, 59, 60, and 61, respectively.

Referring again to Figs. 1 and 3, polar deflection system 32 comprises a center electrode 64 and a curved electrode 66. Center electrode 64 constitutes a conductive rod and is disposed along the center of the path occupied by the electron beam produced by electron gun 30. Curved electrode 66 is disposed concentrically about center electrode 64 and subtends an angle from electrode 64 that includes the electron beam. Electrodes 64, 66 are maintained at quiescent ground potential by connections therefrom through isolation resistors 67, 68, respectively, to ground. A sweep voltage is impressed on deflection system 32 by coupling electrodes 64, 66 through capacitors 69, 70, respectively, to the sweep generator 16. Also, in order to maintain the current density of the electron beam substantially constant at the viewing screen 31 throughout a sweep period, a portion of the sweep voltage from sweep generator 16 is also impressed on intensity electrode 40 of electrode gun 30. The polarity of the sweep voltage is poled so that the current density of each element of the beam is a minimum when all the elements are deflected towards the common center point 55, Fig. 4. As the elements of the beam are deflected radially outwards, the composite beam impinges over a progressively larger area. In order to counteract the concomitant decrease in current density, the sweep voltage progressively increases the potential impressed on the intensity electrode 40 to increase the overall current in the electron beam. A portion of the sweep voltage is impressed on the intensity electrode 40 by a connection therefrom through a capacitor 72 to a tap 74 of a potentiometer 75 which is in turn connected across the output from sweep generator 16.

The electron beam thus produced by electron gun 30 is directed towards the viewing screen 31. The region intermediate the viewing screen 31 and the polar deflection system 32 is maintained at an equipotential by means of a conductive coating 77 connected to ground and disposed on the inner surface of envelope 26. Conductive coating 77 may be provided, for example, by a colloidal suspension of graphite in water. The extremity of conductive coating 77 adjacent the flat end portion 28 of envelope 26 is connected to the viewing screen 31.

Viewing screen 31, a plan view of which appears in Fig. 2, comprises a series of narrow fluorescent strips 80, 81, 82, 83, 84, 85, 86, 87, and 88 disposed on the flat end portion 28 of the envelope and arranged to correspond, respectively, to the vertical angles representative of receiving channels $a_1$, $b_1$, $c_1$, $d_1$, $e_1$, ... $n_1$. The remaining portion of the viewing screen 31 is constituted of a conductive coating 90. Conductive coating 90 may also comprise an evaporated layer of aluminum that covers the entire end portion 28 of the envelope including the fluorescent strips 80—88 or a transparent conductive coating such as, for example, tin oxide, disposed directly on the glass beneath the fluorescent strips 80—88.

Thin conductive ribbons 92, 93, 94, 95, 96, 97, 98, 99 and 100 are disposed edgewise over the center of the fluorescent strips 80—88, respectively. These conductive ribbons 92—100 are supported by an annular ring 102 with which they are maintained in insulative relationship by being attached thereto with a suitable dielectric material such as, for example, glass. Leads $a_2$, $b_2$, $c_2$, $d_2$, $e_2$, ... $n_2$ from the conductive ribbons 92—100 are brought out through the envelope 26 and connected, respectively, to the output of receiver channels $a_1$, $b_1$, $c_1$, $d_1$, $e_1$, ... $n_1$. The conductive ribbons 92—100 are maintained at a quiescent negative potential of the order of −100 volts. This is effectuated by connections therefrom through isolation resistors 104—109, respectively, to the negative terminal of a battery 110, the positive terminal of which is connected to ground.

In the operation of the range-height parallel-type radar system of the present invention, a microwave pulse is transmitted from the antenna system 20 simultaneously with the commencement of the sweep voltage generated by sweep generator 16, both being controlled by master pulse generator 10. The receiving channels $a_1$, $b_1$, $c_1$, $d_1$, $e_1$, ... $n_1$ receive target echoes within the vertical angle corresponding to their particular channel. These target echoes are detected and the resulting video signal amplified to the extent that a "strong" signal may have a peak magnitude of 500 volts positive with respect to ground. These amplified video signal outputs from receiving channels $a_1$, $b_1$, $c_1$, $d_1$, $e_1$, ... $n_1$ are impressed on their associated conductive ribbons 92—100, respectively.

The mode of operation of the conductive ribbons 92—100 in conjunction with the viewing screen 31 is illustrated in Figs. 5 and 6. These figures show a transverse cross sectional view of conductive ribbon 92 disposed edgewise over the fluorescent strip 80. In the absence of a video signal, as shown in Fig. 5, the conductive ribbon 92 will be at a quiescent potential of the order of —100 volts negative with respect to ground. The actual magnitude which this voltage should have will, of course, depend on the velocity of the electron beam, the distance over which the electrons are exposed to the electric field produced by this voltage, and the distance of the ribbon from the fluorescent strip. The potential of the surrounding non-fluorescent conductive layer 90 is, as previously specified, ground. Thus when the expanding circular electron beam is deflected over the conductive ribbon 92, the electrons passing immediately adjacent thereto will be repelled away by the potential gradient between the ribbon 92 and conductive layer 90 as shown in Fig. 5.

The impressing of video signals of increasing magnitude on the conductive ribbon 92, produces an increase in the convergence of the beam electrons on the fluorescent strip 80. Thus the greater the amplitude of the signal, the more the beam electrons are converged on the fluorescent strip (see Fig. 6) and the brighter the indication representative of the target. In that the sweep generator 16 commenced the sweep voltage simultaneously with the initial transmission of energy, the indication thus produced occurs at a distance along the strip corresponding to the range of the target from the antenna system 20. The range-height indicator tube described in connection with Fig. 1 thus presents a display whereby the abscissa is representative of the range of the targets and the ordinate representative of the height, as shown in Fig. 4.

An alternate embodiment of the range-height indicator tube employed in the range-height parallel-type radar system, of Fig. 1, is schematically represented in Fig. 7. In this embodiment, a flat sheet electron beam is produced and deflected across a horizontal element mask 120 and screen 122 by an electron gun 124 for producing a sheet electron beam, and deflecting plates 126 adapted to deflect the sheet beam. Horizontal element mask 120 comprises a conductive plate 130 having a series of longitudinal horizontal apertures extending substantially across its entire width. Within the center of each aperture there is disposed a thin conductive ribbon 132 which is maintained insulated from the plate 130. In operation, the plate 130 is maintained at a fixed potential such as ground, and the conductive ribbons 132 are maintained at a quiescent potential of the order of —100 volts with respect to ground, and are coupled respectively to corresponding receiving channels $a_1$, $b_1$, $c_1$, $d_1$, $e_1$, ... $n_1$.

The viewing screen 122 is disposed behind and adjacent to horizontal element mask 120 and is coextensive therewith. The viewing screen 122 comprises a series of fluorescent strips 134 which are slightly narrower than the apertures in plate 130 and are disposed in alignment therewith. As before, the remaining portion of the viewing screen 122 is covered with a conductive layer 136.

In operation of the embodiment shown in Fig. 7 the apparatus for concentrating the electron beam on the fluorescent strips is more sensitive than that of the indicator tube of Fig. 1. This is because the distance between the conductive ribbons 132 and an adjacent conductive surface is substantially less, thereby providing a higher potential gradient with a smaller voltage to produce a correspondingly greater deflection. This effect is illustrated in Figs. 9 and 10 which show an enlarged transverse cross sectional view of one of the apertures in horizontal element mask 120. In these figures, the plate 130 and the conductive layer 136 are maintained at ground potential such that when the conductive ribbon 132 has a positive excursion of potential, the beam electrons are converged towards the fluorescent strips 134, as shown in Fig. 9. When there is no signal impressed on the conductive ribbon 132, i. e., when the ribbon is allowed to return to its quiescent negative potential, the beam electrons are repelled away from the fluorescent strip 134 and are caused to impinge upon the conductive layer 136, where they do not produce any visual effect as illustrated in Fig. 10. In view of the increased deflection of the beam electrons produced by the conductive ribbons 132, a video signal having peak amplitudes of only 220 volts may be used. Except for this, the operation of the indicator tube of Fig. 7 is similar to that described for the indicator tube of Fig. 1.

The display of the indicator tube of Fig. 7, as shown in Fig. 8, differs from that of the tube shown in Fig. 1 in that the ordinate of the display is representative of the angle of elevation instead of the height of the target. The abscissa of the display also differs from Fig. 1 in that it is representative of the slant range of the target from the antenna system 20, instead of the ground range.

What is claimed is:

1. A radar system including apparatus for radiating an exploratory microwave pulse over a broad angle; a plurality of receiving channels for receiving and amplifying reflected energy within predetermined portions of said broad angle in response to the exploratory pulse; an indicator tube having a viewing screen including a transparent member for providing a support surface, a number of fluorescent strips corresponding, respectively, to the number of the receiving channels and disposed on said support surface in a manner to correspond to the predetermined portions of the broad angle, and a non-fluorescent conductive layer disposed over the remaining portion of said support surface; means for producing a sheet electron beam; means for deflecting said sheet electron beam over said fluorescent strips in synchronism with the exploratory pulse; and a plurality of longitudinal conductors disposed coextensively along said fluorescent strips and coupled, respectively, to the corresponding receiving channel for simultaneously directing the electrons of said beam towards each fluorescent strip in numbers representative of the magnitude of the respective output signal from the corresponding receiving channel.

2. The radar system as defined in claim 1 which additionally includes apparatus providing a conductive surface extending lengthwise along and equidistant from at least one side of said longitudinal conductors, and means for maintaining said conductive surfaces at a substantially fixed potential thereby to increase the transverse force on said beam electrons per volt impressed on said longitudinal conductors.

3. The radar system as defined in claim 2 wherein said apparatus providing a conductive surface consists of a conductive plate having longitudinal apertures surrounding said longitudinal conductors.

4. The radar system as defined in claim 1 wherein said longitudinal conductors disposed coextensively along said fluorescent strips consist of thin tape conductors which are disposed edgewise with respect to said fluorescent strips.

5. A radar system including apparatus for radiating an exploratory microwave pulse over a broad angle, and a plurality of receiving channels for receiving and amplifying reflected energy within predetermined portions of the broad angle in response to the exploratory pulse, an indicator tube having a viewing screen including a transparent member for providing a support surface, a number of fluorescent strips corresponding respectively to the number of the receiving channels and disposed on said support surface at an angle representative of the predetermined portion of the broad angle; means for producing an arc-shaped electron beam; means for deflecting said arc-shaped electron beam in a radial direction over said fluorescent strips in synchronism with the exploratory pulse; and a plurality of longitudinal conductors disposed coextensively along said fluorescent strips and coupled, respectively, to the corresponding receiving channel for simultaneously directing the electrons of said beam towards each fluorescent strip in numbers representative of the magnitude of the respective output signal from the corresponding receiving channel.

6. A radar system including apparatus for radiating an exploratory microwave pulse over a broad angle, a plurality of receiving channels for receiving and amplifying reflected energy within predetermined portions of the broad angle in response to the exploratory pulse, an indicator tube having a viewing screen including a transparent member for providing a support surface, a number of fluorescent strips corresponding respectively to the number of the receiving channels and disposed parallel and coextensive with each other on said support surface; means for producing a rectilinear sheet electron beam; means for deflecting said sheet electron beam over said fluorescent strip in synchronism with the exploratory pulse; and a plurality of longitudinal conductors disposed coextensively along said fluorescent strips and coupled, respectively, to the corresponding receiving channel for simultaneously directing the electrons of said beam towards each fluorescent strip in numbers representative of the magnitude of the respective output signal from the corresponding receiving channel.

7. A radar system including apparatus for radiating an exploratory microwave over a broad angle; a plurality of receiving channels for receiving and amplifying reflected energy within predetermined portions of said broad angle in response to the exploratory pulse; an indicator tube having a viewing screen including a transparent member for providing a support surface, a number of fluorescent strips corresponding, respectively, to the number of the receiving channels and disposed on said support surface in a manner to correspond to the predetermined portions of the broad angle, and a non-fluorescent conductive layer disposed over the remaining portion of said support surface; means for producing an electron beam, the transverse cross section of which has a plurality of elements; means for simultaneously deflecting the elements of said electron beam over each of said fluorescent strips in synchronism with the exploratory pulse; and a plurality of longitudinal conductors disposed coextensively along said fluorescent strips and coupled, respectively, to the corresponding receiving channel for simultaneously directing the electrons of said beam towards each fluorescent strip in numbers representative of the magnitude of the respective output signal from the corresponding receiving channel.

References Cited in the file of this patent

UNITED STATES PATENTS 2,711,493     Lawrence _____ June 21, 1955